Nov. 7, 1939.      O. P. WILLIAMS      2,178,676
ADJUSTABLE GAS VALVE
Filed Aug. 10, 1937      2 Sheets-Sheet 2
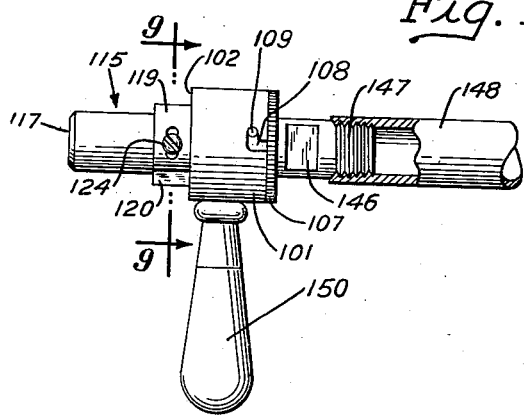
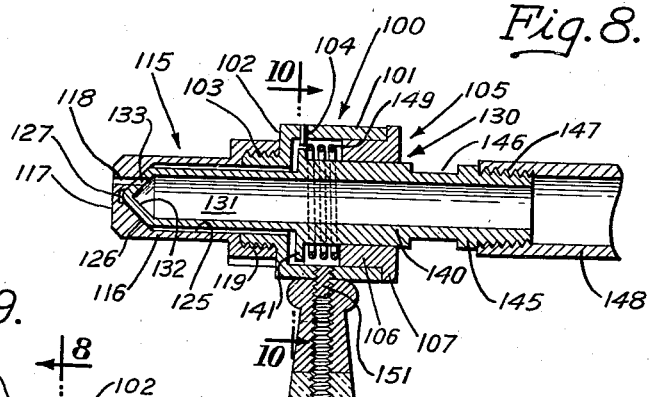
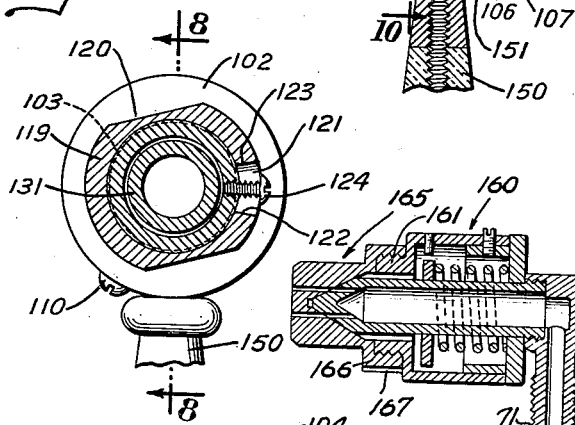
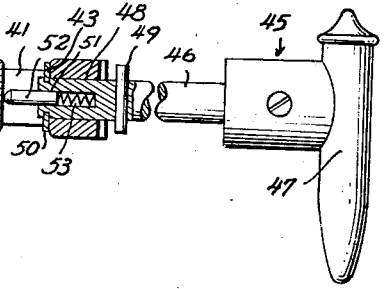
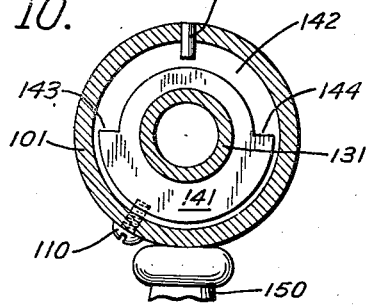
Inventor.
Ormsby P. Williams
By Hazard and Miller
Attorneys.

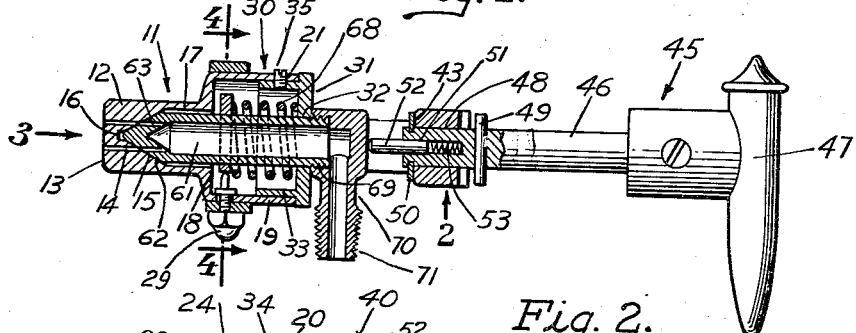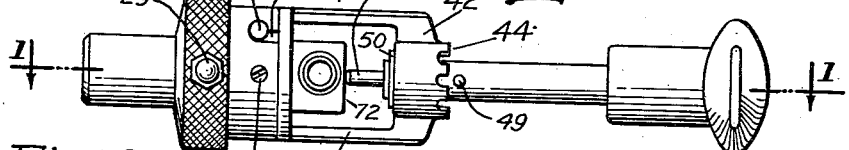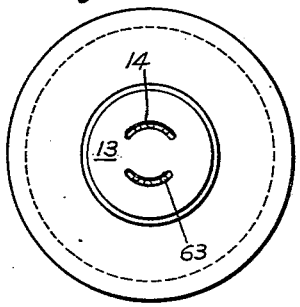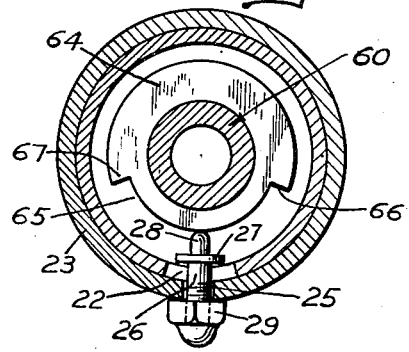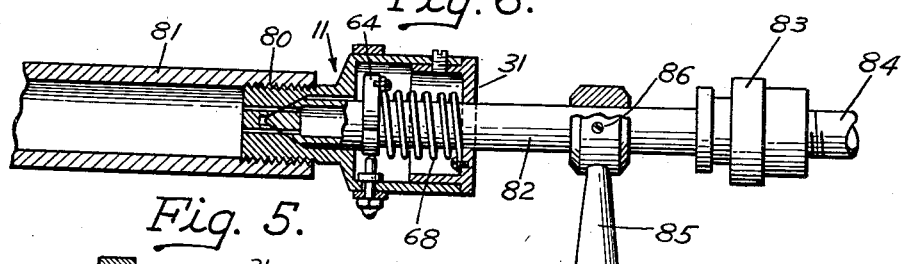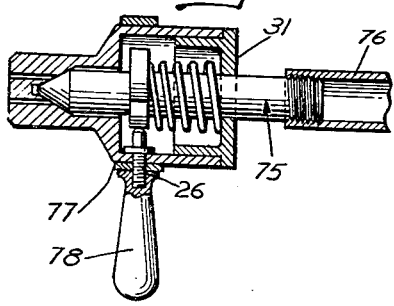

Patented Nov. 7, 1939

2,178,676

UNITED STATES PATENT OFFICE 2,178,676

ADJUSTABLE GAS VALVE

Ormsby P. Williams, Huntington Park, Calif.

Application August 10, 1937, Serial No. 158,297

4 Claims. (Cl. 251—9)

My invention relates to a valve of a type suitable for use as a gas valve and may be considered as somewhat of the type illustrated in my patent application Ser. No. 613,816, filed May 27, 1932, now Patent No. 2,090,277, granted August 17, 1937, entitled Adjustable orifice and valve.

One of the objects and features of my present invention in an orifice type of valve is making such valve with an adjustable positive stop to the opening whereby in adjusting the position of such stop, a variable valve opening is obtained. Another detail object and feature is in constructing the valve with an inner coned shaped tubular member and an outer tubular member having a conical seat, these members only contacting at the seat. The inner member instead of having only one jet opening as shown in my prior patent and the outer member only having a single passage to align therewith, is changed in design whereby the inner member has a plurality of jet openings arranged in an arc which are designed to register with one or more arcuate slots in the outer valve member. In accordance with my construction, either the inner or the outer member may be rotated and one of the members held stationary. Therefore by having the plurality of jet openings operating over the discharge slots, a regulation may be obtained of the amount of opening of the valve in accordance with the number of orifices which are in registry with the arcuate slot or slots.

Another object and feature of my invention is providing an adjustable stop pin preferably connected to the outer member and shiftable as to the periphery of such member and this co-acts with fixed stops on the inner member. Therefore by adjusting the position of the stop pin and when operating the valve to move such pin from contact from one of the shoulders when the valve is closed, to the other shoulder when the valve is opened, an adjustable and predetermined opening may be obtained for the valve.

Another feature of improvement relates to the connection of an operating handle to the valve, this handle having a sliding connection preferably to the outer member when the inner member of the valve is held fixed in position. This requires a longitudinal movement of the handle stem to interengage with the rotatable part of the valve and unless so interengaged, the handle and stem may rotate freely. This gives a safety device for operating the valve and reduces danger of accidentally opening the valve.

Another object and feature of my invention is in employing a twist type of spring which, when the valve is opened, is pressed under tension and thus when the valve is released, the spring unwinds and automatically closes the valve. Such spring is combined in its function with a valve seating spring as in my patent application above mentioned.

Another object and feature of my invention relates in adjusting the orifice of the outer valve member in relation to the inner valve member by having the outer part adjustable on a valve housing into which the inner member extends. Therefore the valve seat part of the outer member may be partially rotated on the valve housing and thus slightly change the position of the two orifices when the valve is in the open position. This allows for an accurate adjustment of the valve jet. Therefore in one construction a pin which engages shoulders formed in a notch of a collar on the inner valve member and this being adjustable in a slot in the housing allows for adjusting the position of the orifices and in another form a pin forming a lock between the housing and the outer part of the outer valve member forms the adjustment as to the orifice openings.

My invention is illustrated in connection with the accompanying drawings, in which:

Figure 1 is a vertical longitudinal section on the line 1—1 of Figure 2 taken in the direction of the arrows of a construction in which the inner valve tubular member is held stationary and the outer valve member is rotated through the medium of a yoke and a disconnectible handle stem, the handle and the portion of the stem being illustrated in elevation.

Figure 2 is a plan taken in the direction of the arrow 2 of Figure 1.

Figure 3 is an end elevation taken in the direction of the arrow 3 of Figure 1 on an enlarged scale.

Figure 4 is a vertical transverse section on the line 4—4 of Figure 1 taken in the direction of the arrows.

Figure 5 is a longitudinal section of a modified form in which the handle is attached to a wall housing of the outer valve member.

Figure 6 is a longitudinal section of a further modification showing the inner member of the valve being rotatable and returned to a closed position by spring action.

Figure 7 is a side elevation of a modified construction in which the outer valve member having the orifice is adjustable in a rotational manner.

Figure 8 is a longitudinal section of the valve of Fig. 7 on the section line 8—8 of Fig. 9 in the direction of the arrows.

Figure 9 is a transverse section on the line 9—9 of Fig. 7 in the direction of the arrows.

Figure 10 is a transverse section on the line 10—10 of Fig. 8 in the direction of the arrows.

Figure 11 is a modification of the construction shown in Fig. 1 with the outer valve member adjustable.

Referring first to the construction of Figures 1, 2 and 3, the outer tubular valve member designated by the numeral 11, has a discharge end structure 12 which is cylindrical on its outer surface and has a plane end 13 at right angles to the axis of the valve. This end has two arcuate slots 14 which extend to the conical seat 15. At the apex of this seat there is a recess 16. This outer member has an inner bore 17 extending from the base of the cone shaped seat. An annular flange 18 extends outwardly from the bore 17 and formed integral with this is a cylindrical skirt 19. This has a pair of bayonet type of slots 20 therein and a perforation 21 for a set screw. The wall of the skirt has an arcuate slot 22 (note Figure 4). This slot is covered by an annular collar 23, such collar having a knurled outer surface indicated at 24. A perforation 25 extends through the collar and a clamping pin 26 extends through the perforation 25 and the slot 22. This pin has a washer 27 connected thereto at the inner end and an inwardly projecting pin end 28. A clamping nut 29 on the outside of the pin when tightened, locks the collar to the skirt with the pin end 28 in any desired position between the ends of the slot 22.

The valve housing designated 30 which includes the flange 18 and the skirt 19, also has a disc-like base 31 with a circular opening 32 therein and from this base there is an internal sleeve 33 fitting inside the skirt 19. A stud 34 extending radially from the sleeve 33 engages in the bayonet slot 20. In addition to the attachment by the bayonet slot and this stud, there is a set screw 35 attaching the skirt 19 and the sleeve 33.

A yoke 40 has two arms 41 preferably formed integral with the disc-like base 31 having an inwardly turned hub 42. This hub has an inner face 43 and a notched outer face 44. The handle assembly 45 has a stem 46 to which handle 47 is attached. The stem has a cylindrical end 48 rotatably mounted in the hub 42 of the yoke. An operating pin 49 extends diametrically through the stem and is adapted to engage in any diametrically opposite pair of the notches in the notched outer face 44 in the hub. The stem has an enlarged washer 50 connected thereto which prevents disconnection of the handle stem from the yoke. The stem is provided with an axial socket 51 in which operates a pressure pin 52, this pin being normally thrust outwardly by a compression spring 53 engaging the pin and the base of the socket 51.

The inner tubular valve member designated by the assembly numeral 60, has a cylindrical body 61 which is of less diameter than the bore 17 of the outer valve member. A coned end 62 bears against the coned seat 15, the apex extending into the recess 16. The coned end of the inner member has preferably two series of parallel jet orifices 63. These are small bore orifices preferably each circular in diameter and arranged in an arc to align with the slots 14 of the outer member. A collar 64 is preferably formed integral with the body of the inner member and is spaced from the inside of the flange 18 of the outer member. This collar has an arcuate notch 65 providing two stop shoulders 66 and 67 (note Figure 4). A compression spring 68 bears against the disc-like base 31 and the collar 64, thereby maintaining a seating bearing between the coned shape end of the inner member and the conical seat of the outer member. This spring may be attached at its opposite ends to the disc-like base 31 and the collar 64. The outer end of the inner valve member preferably has external threads 69 to which is connected an elbow 70, this elbow having a threaded nipple end 71 for connection to a gas pipe. The elbow has a flat end 72 which is engaged by the end of the pressure pin 52 which with the spring 53 due to the reaction, tends to force the handle stem outwardly, thus normally maintaining the pin 49 disconnected from the notched end 44 of the outer member. Hence the disengaged pin permits free rotation of the handle and its stem without operating the valve.

The manner of operating and the functioning of the device of Figures 1 to 4 is substantially as follows: As above mentioned, the handle with its stem 46 may be thrust inwardly until the transverse pin 49 engages in the notched end 44 of the hub, which through the medium of the yoke 40 is connected to the outer valve member and as the inner valve member is held from rotation by the elbow structure 70, the valve may be rotated from the open to the closed position. The movement is limited by the pin 28 engaging the shoulders 66 and 67, one shoulder defining the closed position and the other shoulder, the full open position of the valve. The handle may then be automatically returned due to the reaction of the spring 53 and the pin 52. As above mentioned, if desired, the coil spring 68 may be arranged to operate as a twist spring so that when the handle is released the spring will automatically rotate the outer valve member to the closed valve position.

In the device of Figure 5, the yoke 40 with its hub is omitted and the inner valve member has an integral extension 75 beyond the base 31. This extension is connected to a supply pipe 76, the supply pipe thus holding the valve assembly in the desired position. In this construction the pin 26 instead of having a nut such as shown in Figure 4, is provided with a flat headed nut 77 and on the end of the pin there is threaded a handle 78. The nut 77 may be tightened on the pin so as to clamp the collar 23 at any desired place in the slot 22. In this case the compression spring 68 may be attached to the base 31 and the collar 64 in order to operate as a compression and a tension spring. In this construction therefore when the pin 26 is clamped to both the collar and the skirt of the outer valve member, this outer valve member may be turned by grasping the handle 78.

In the construction of Figure 6 the outer valve member 11 is modified by having this externally threaded as indicated at 80 and threaded into a fixed pipe 81. This holds the outer valve member stationary. In this case the base 31 is the same as in Figure 5, that is, the yoke structure 40 of Figures 1 and 2 is omitted. The coil compression spring 68 may be used to operate either as a compression spring or as a combination compression and twist spring. In this arrangement the inner valve member has an extension 82 which fits in a rotatable coupling structure 83 connected to a supply pipe 84. In this case it is necessary to have a leak-proof packing connecting the pipe portion 82 of the inner valve member in the coupling 83. A handle 85 is attached to the extension 82 preferably by a set screw 86 so that in this construction of Figure 6 the inner valve member is rotated instead of having the outer valve member rotatable. This construction with the spring 68 is operative to close the valve and forms a safety construction in which the gas is only turned on for comparatively short periods with the operator controlling the handle so that when he lets go of the handle the valve is automatically closed.

Referring next to the construction of Figs. 7, 8 and 9, the main part of the valve housing 100 has a cylindrical skirt 101, an inturned flange 102 and an externally threaded neck 103. A stop pin 104 extends through the skirt. A closure base 105 has a sleeve 106 fitting inside of the skirt and an annular shoulder 107 engaging the end of the skirt. These parts are attached by a bayonet slot connection 108, the slot being formed in the skirt and there being pins 109 on the sleeve extending into these slots. A lock screw 110 locks the sleeve and the skirt when attached by the bayonet slot and pin connection.

The outer tubular valve member 115 is preferably cylindrical on the main portion of the outside surface indicated at 116 and has a flat or transverse end 117 with a single circular orifice 118 extending through the end parallel to the axis and offset from the center. An internally threaded nut 119 is formed integral with the cylindrical portion 116 and has flattened sides 120 forming a wrench grip. This nut has a slot 121 with the terminating ends 122 and 123 (note Fig. 9) and an adjusting lock screw 124 extends through this slot and is threaded into the threaded neck 103 of the main portion of the housing. This construction of the outer valve member is substantially similar to the former constructions having a cylindrical inside surface 125, a conical valve seat end 126 with a recess 127 at the apex. In this construction the inner tubular valve member designated by the assembly numeral 130 has the cylindrical body 131, the outside having a clearance between the inside cylinder 125. This is provided with a cone shaped end 132 seating against the inside cone 126 and there is a single circular orifice 133 to register with the orifice 118 and thus form a discharge orifice. Formed integral with the tubular portion 131 there is a cylindrical bearing section 140 having a rotational fit inside of the sleeve 106. This is provided with a collar 141, the collar having an annular notch 142 with opposite shoulders 143 and 144, this construction being substantially the same as shown in the other figures, the shoulders being engaged by the stop pin 104. For convenience of assembly the extension 145 of the inner valve member from the cylindrical bearing section 140 has flattened wrench grip surfaces 146 and has a threaded connection 147 to a gas supply pipe 148, such pipe being fixed. A compression spring 149 bears against the sleeve 106 and the collar 141 and thus maintains a proper seat of the cone shaped ends of the inner and outer valve members. An operating handle 150 is threaded on a pin 151 projecting from the skirt 101. Therefore by this construction the housing including the outer valve member is rotated while the inner valve member is held stationary, this being attached to the gas pipe 148.

In this arrangement the valve is adjusted so that when the pin 104 engages either of the stop shoulders 143 or 144, the valve is open. If the full registry of the orifices 118 and 133 gives too large an orifice, that is, permits too great a flow of gas, the outer valve member may be adjusted by loosening the screw 124 partly rotating this member by the use of a wrench on the nut portion 119, the pin having the travel in the slot 121. Then when the proper adjustment is obtained the screw 124 is tightened, thus locking the outer valve member 115 to the main portion of the valve housing 100. Although the main valve housing and the outer valve member are shown as being connected by screw threads, the small arc provided by the slot 121 is insufficient to make any material longitudinal adjustment, hence the coned end 132 of the inner valve member maintains its proper seat with the cone of the outer valve member.

In the construction of Fig. 11 I illustrate an arrangement for adjusting the outer valve member on the main portion of the housing applicable to the construction of Fig. 1 and also by a modification to Figs. 5 and 6. In this case the main portion of the valve housing 160 has a threaded neck 161. The outer valve member 165 is provided with the nut section 166 preferably having flattened sides 167. This nut section has a slot similar to the slot 121 and a clamping screw similar to the clamping screw 124, therefore the outer valve member may have slight adjustments relative to the main portion of the housing to secure accurate registry of the fixed and moving jet orifices. In this Fig. 11 the arms 41 of the yoke 40 of Figs. 1 and 2 are illustrated together with the pressure pin 52. The arm of the yoke and the pressure pin is broken as the rest of the construction for rotating the outer valve member is the same as shown in Figs. 1 and 2. Therefore the construction of Fig. 11 may be considered as having the operating handle construction with the yoke designated by the assembly numerals 40 and 45 with the specific valve construction shown in Fig. 11.

Various changes may be made in the details of the construction without departing from the spirit or scope of the invention as defined by the appended claims.

I claim:

1. A valve comprising in combination an outer valve member including a valve housing with a base having a central opening and an outer portion with a closed end rotatably adjustable on the valve housing, a pin and slot connection to regulate said adjustment, the outer portion of the outer member having a closed end with an internal conical seat, an inner valve member extending through the opening in the base and having a complementary cone shaped end to engage the said seat, there being aligned orifices through the end of the outer and inner valve member eccentric to the axis of the outer and inner valve members, a collar having a notch attached to the inner valve member, said notch providing shoulders, a fixed pin secured to the valve housing to engage either of said shoulders and a compression spring between the base of the housing and the collar to form a seating of the cone shaped end of the inner valve member against its seat.

2. A valve as claimed in claim 1, the rotatable adjustment of the outer part of the outer valve member on the housing including threads on the housing engaged by complementary threads on the outer end portion, the pin and slot connection including a slot in the outer valve member and a pin extending therethrough and engaging the threaded part of the housing.

3. A valve comprising in combination an outer valve member including a valve housing with a base having a central opening and an outer portion with a closed end, means to rotatably adjust the closed end on the valve housing, a pin and slot connection to regulate said adjustment of the closed end and the housing, the closed end portion of the outer member having an internal conical seat with an orifice offset from the center, an inner valve member extending through the opening in the base and having a cone shaped end to engage the seat and provided with an orifice, the said orifices being alignable, a stop means between the housing and the inner valve member to permit rotation of such inner member between limits, means to retain the inner member stationary, said means providing a tubular connection to the inner valve member, a yoke connected to the outer valve member and having a hub with a perforation, a handle having a stem, the stem extending through said perforation, a pressure means thrusting the stem outwardly, an interengaging means between the stem and the hub when the stem is pressed inwardly to rotate the yoke and hence the valve housing.

4. A valve comprising in combination a hollow valve housing having a base with a central opening, an outer valve member connected to the housing and having a closed end with an internal conical seat and a cylindrical bore extending from the seat, an inner tubular valve member extending through the opening in the base and having a closed conical end bearing against said seat, the ends of the inner and outer valve members each having orifices eccentric to the axis of said inner and outer valve members, there being a clearance between the said bore of the outer valve member and the inner valve member, a collar secured to the inner valve member having a notch with stop shoulders, a compression spring between the base of the housing and the said collar, a stop pin secured to the housing and having an inner end positioned to engage either of the said shoulders, means to hold the inner valve member stationary, means to rotate the valve housing and outer valve member to align the said orifices or to disalign the same and means to adjust the orifices of the inner and outer valve members slightly out of alignment to change the jet opening when the orifices are in registry, the means to adjust the orifices comprising the valve housing and the outer valve member being formed in separate parts with a rotational connection and a pin and slot connection at the said rotational connection for effecting a rotational adjustment of the valve housing and the outer valve member.

ORMSBY P. WILLIAMS.